United States Patent
Matsuishi

(10) Patent No.: US 10,761,634 B2
(45) Date of Patent: Sep. 1, 2020

(54) TOUCH PANEL CONTROL DEVICE AND ELECTRONIC DEVICE

(71) Applicant: SHARP KABUSHIKI KAISHA, Sakai, Osaka (JP)

(72) Inventor: Takuya Matsuishi, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/310,793

(22) PCT Filed: Jun. 28, 2017

(86) PCT No.: PCT/JP2017/023770
§ 371 (c)(1),
(2) Date: Dec. 17, 2018

(87) PCT Pub. No.: WO2018/008492
PCT Pub. Date: Jan. 11, 2018

(65) Prior Publication Data
US 2019/0265826 A1    Aug. 29, 2019

(30) Foreign Application Priority Data

Jul. 6, 2016  (JP) ................................ 2016-134467

(51) Int. Cl.
*G06F 3/041* (2006.01)
*G06F 3/044* (2006.01)
*G09G 3/36* (2006.01)

(52) U.S. Cl.
CPC ............ *G06F 3/0412* (2013.01); *G06F 3/041* (2013.01); *G06F 3/0446* (2019.05); *G06F 3/041661* (2019.05); *G09G 3/3674* (2013.01); *G06F 2203/04106* (2013.01)

(58) Field of Classification Search
CPC .... G06F 3/0412; G06F 3/0416; G06F 3/0446; G09G 3/3674
USPC .................................................. 345/173, 174
See application file for complete search history.

(56) References Cited

U.S. PATENT DOCUMENTS

| | | | |
|---|---|---|---|
| 10,338,727 B2* | 7/2019 | Yu | ........................... G06F 3/044 |
| 10,664,677 B2* | 5/2020 | Lee | ..................... G02F 1/13452 |
| 2006/0214924 A1* | 9/2006 | Kawamoto | ......... G06F 3/04883 |
| | | | 345/173 |

(Continued)

FOREIGN PATENT DOCUMENTS

| | | |
|---|---|---|
| JP | H09-305315 A | 11/1997 |
| JP | 2011-507123 A | 3/2011 |
| JP | 2014-211850 A | 11/2014 |

Primary Examiner — Calvin C Ma
(74) Attorney, Agent, or Firm — ScienBiziP, P.C.

(57) ABSTRACT

The present invention improves the accuracy of detection of touch coordinates in a second area within a first area while reducing power consumed by a device as a whole. A control circuit (23) controls a driving circuit (21) and a detection circuit (22) so that the driving circuit (21) and the detection circuit (22) perform scanning on a plurality of drive electrodes and a plurality of detection electrodes, both of which construct a first area of a touch panel (1), and perform scanning at least once on part of the plurality of detection electrodes and part of the plurality of drive electrodes, both of which construct a second area within the first area, after the scanning on the first area has been performed but before a subsequent scanning on the first area is started.

8 Claims, 16 Drawing Sheets

(56) References Cited

U.S. PATENT DOCUMENTS

| | | | |
|---|---|---|---|
| 2011/0025619 A1 | 2/2011 | Stantum | |
| 2013/0265276 A1* | 10/2013 | Obeidat | G06F 3/044 345/174 |
| 2014/0022190 A1* | 1/2014 | Tokutake | G06F 3/0488 345/173 |
| 2014/0313146 A1* | 10/2014 | Munechika | G06F 3/041 345/173 |

* cited by examiner

FIG. 7
(a)
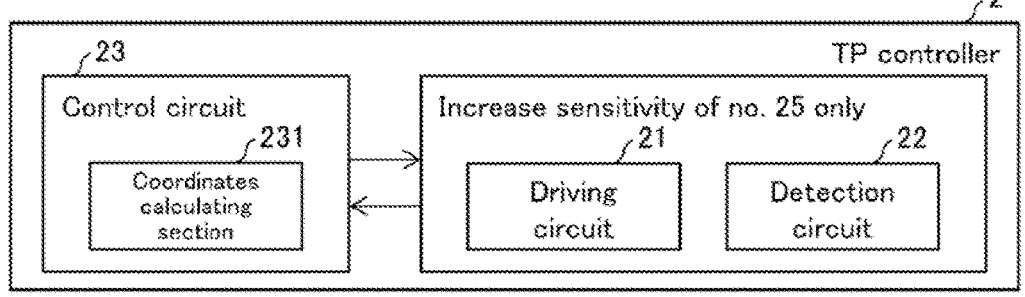
(b)
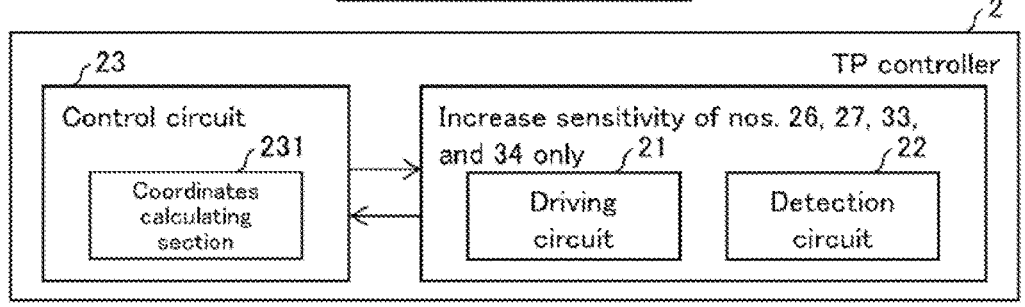

FIG. 10
(a)
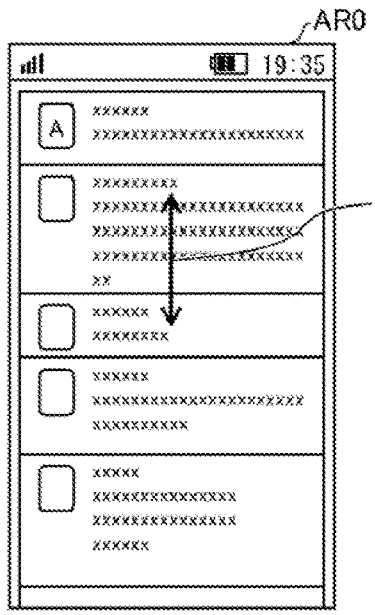
(b)
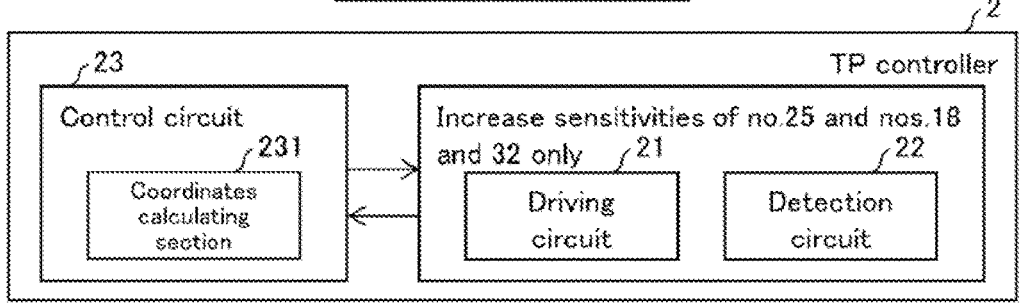

FIG. 15
(a)
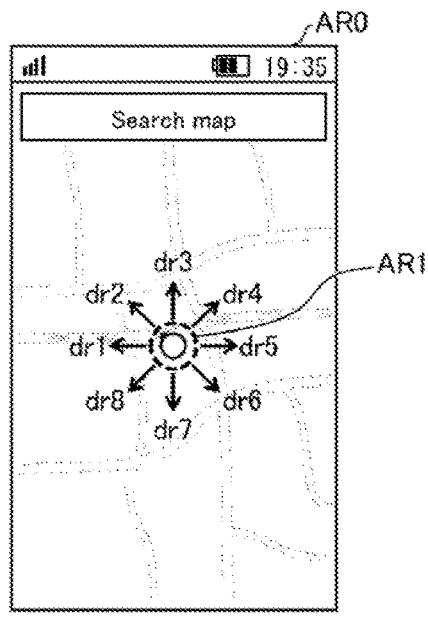
(b)
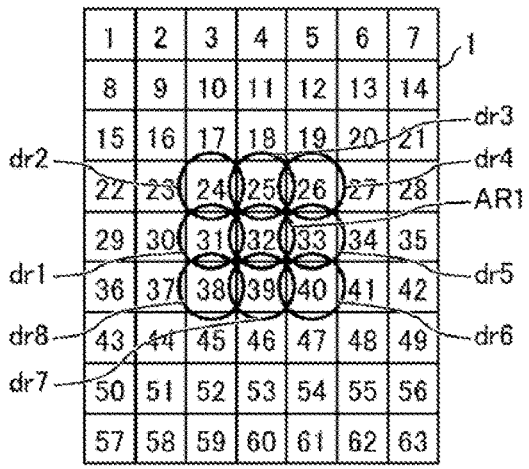
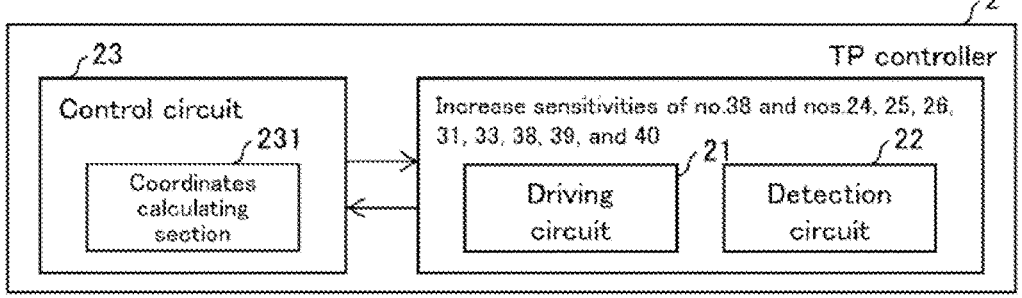

TOUCH PANEL CONTROL DEVICE AND ELECTRONIC DEVICE

TECHNICAL FIELD

The present invention relates to (i) a touch panel control device including: a driving circuit which applies a drive signal to a plurality of drive electrodes of a touch panel; a detection circuit configured to detect a detection signal from a plurality of detection electrodes of the touch panel; and a control circuit configured to control the driving circuit and the detection circuit, and (ii) an electronic device including the touch panel control device.

BACKGROUND ART

Various types of touch position detection systems are known in the art. Particularly, a touch panel control device which employs a capacitive system using a capacitance is very convenient to use. This is because such a touch panel control device allows a user to perform a direct touch operation with a fingertip on it and perform a touch operation with an easy-to-use stylus pen made of an electrically conductive material.

Generally, a capacitive touch panel device includes: a touch panel body having a structure in which a plurality of drive electrodes intersect with a plurality of detection electrodes in a grade separation manner; and a touch panel controller for controlling the touch panel body.

The touch panel controller, which is connected to the touch panel through a connector, applies a drive signal to the drive electrodes and detects a touch position based on a detection signal detected by a corresponding one of the detection electrodes. Specifically, when an electrically conductive object approaches or contacts the touch panel body, a change in capacitance occurs at the intersection of a corresponding one of the plurality of drive electrodes and a corresponding one of the plurality of detection electrodes. The touch panel controller can detect a touch position by detecting, from the detection signal detected by a corresponding one of the detection electrodes, a signal intensity at a pair of coordinates of the touch panel body, which correspond to the intersection of a corresponding one of the drive electrodes and a corresponding one of the detection electrodes.

The conventional technique relating to a touch panel controller as described above is disclosed in Patent Literature 1. The touch panel controller disclosed in Patent Literature 1 improves the accuracy of detection in a specific area, i.e., a predetermined range which can vary depending on a touch position at which a touch is detected by using a detection signal obtained by a detection circuit, by adjusting a pulse frequency of a drive signal from a drive electrode unit and a sampling frequency representing a change of a signal from a detection electrode unit (hereinafter the "pulse frequency" and the "sampling frequency" are collectively referred to as "scanning frequency") to be high frequencies in such a specific area.

CITATION LIST

Patent Literature

[Patent Literature 1]
Japanese Patent Application Publication, Tokukai, No. 2014-211850 (Publication Date: Nov. 13, 2014)

SUMMARY OF INVENTION

Technical Problem

The conventional technique as described above provides the improvement in accuracy of detection of touch coordinates by performing scanning on the whole area of the touch panel and increasing the scanning frequency only in a specific area. The increase in frequency only in a specific area unfortunately increases power consumed by a device as whole.

The present invention has been attained in view of the above problem, and it is an object of the present invention to provide a touch panel control device and the like that achieve the improvement in accuracy of detection of touch coordinates in a second area within a first area while reducing power consumed by the device as a whole.

Solution to Problem

In order to solve the above problem, a touch panel control device in accordance with an aspect of the present invention includes: a driving circuit configured to apply a drive signal to a plurality of drive electrodes of a touch panel; a detection circuit configured to detect a detection signal from a plurality of detection electrodes of the touch panel; a control circuit configured to control the driving circuit and the detection circuit; and a coordinates calculating section configured to determine coordinates of a touch position on the touch panel based on the detection signal detected by the detection circuit, the driving circuit being capable of scanning a predetermined drive electrode of the plurality of drive electrodes, the detection circuit being capable of scanning a predetermined detection electrode of the plurality of detection electrodes, the control circuit controlling the driving circuit and the detection circuit so that the driving circuit and the detection circuit perform scanning on the plurality of drive electrodes and the plurality of detection electrodes, both of which construct a first area of the touch panel, and perform scanning at least once on part of the plurality of detection electrodes and part of the plurality of drive electrodes, both of which construct a second area within the first area, after the scanning on the first area has been performed but before a subsequent scanning on the first area is started.

Advantageous Effects of Invention

The above aspect of the present invention produces the effect of improving the accuracy of detection of touch coordinates in the second area within the first area while reducing power consumed by the device as a whole.

BRIEF DESCRIPTION OF DRAWINGS (a) of FIG. 1 is a block diagram illustrating the configuration of an electronic device in accordance with Embodiment 1 of the present invention, and (b) of FIG. 1 is a conceptual diagram conceptually illustrating an example of an operation for scanning control of the touch panel 1 in the electronic device 10.

(a) of FIG. 2 is a view illustrating a range designated for a second area in a case where character input operation keys are displayed, and (b) of FIG. 2 is a view illustrating a range designated for the second area in a case where a touch pen is in contact with a specific character input operation key.

FIG. 3 is a flowchart illustrating the flow of the operations of the electronic device in accordance with Embodiment 1 of the present invention.

(a) of FIG. 4 is a view, relating to operations of an electronic device in accordance with Embodiment 2 of the present invention, illustrating an example case where an area within which a finger reaches in a situation where the electronic device is held with a right hand is designated as a second area, and (b) of FIG. 4 is a view illustrating an example case where an area within which a finger reaches in a situation where the electronic device is held with a left hand is designated as the second area.

(a) of FIG. 5 is a block diagram illustrating the configuration of an electronic device in accordance with Embodiment 2 of the present invention, and (b) of FIG. 5 is a diagram illustrating an example of combinations of electrodes to be scanned in the specific area (in a situation where the electronic device is held with a left hand).

FIG. 6 is a flowchart illustrating the flow of the operations of the electronic device in accordance with Embodiment 2 of the present invention.

(a) and (b) of FIG. 7 are each views for explaining operations of an electronic device in accordance with Embodiment 3 of the present invention.

(a) of FIG. 10 is a view, relating to operations of an electronic device in accordance with Embodiment 4 of the present invention, for explaining an up and down scrolling operation which is expected to be performed during the browsing of a specific webpage, and (b) of FIG. 10 is a view for explaining the operations of the electronic device in accordance with Embodiment 4 of the present invention.

Figure 11:
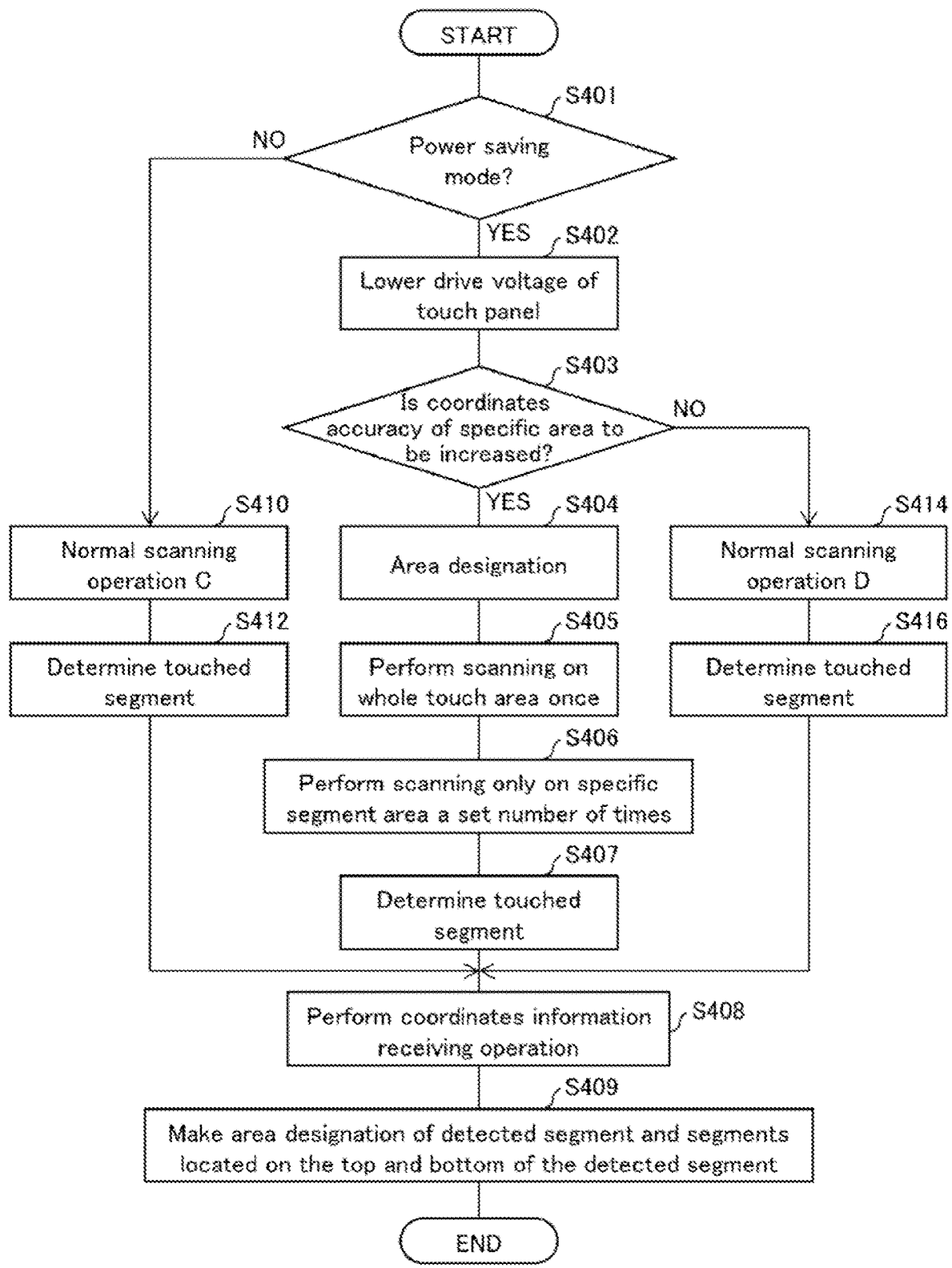

FIG. 11 is a flowchart illustrating the flow of the operations of the electronic device in accordance with Embodiment 4 of the present invention.

Figure 12:
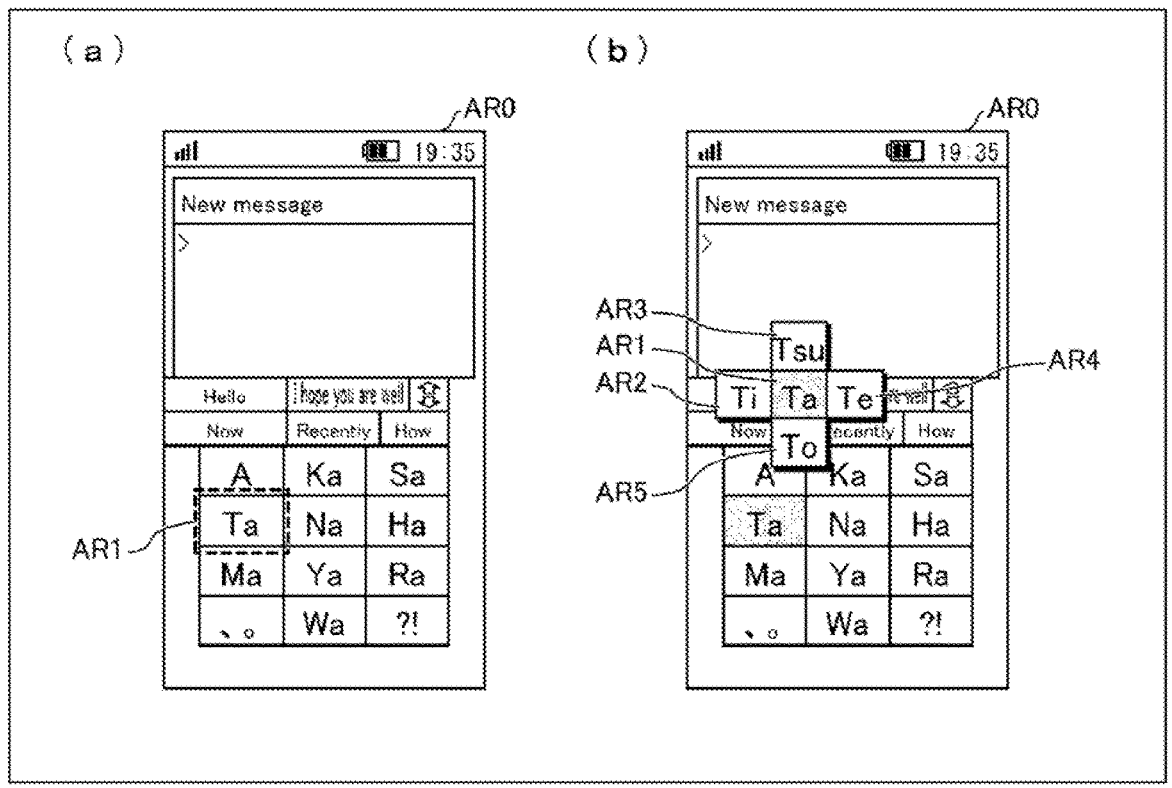

(a) of FIG. 12 is a view, relating to operations of an electronic device in accordance with Embodiment 5 of the present invention, illustrating a state in which a character input operation key "TA" is selected, and (b) of FIG. 12 is a view illustrating a state in which, when the character input operation key "TA" is touched, a pop-up character input operation key "TA" appear, and pop-up character input operation keys "TI", "TSU", "TE", and "TO" appear on the left, right, top, and bottom of the pop-up character input operation key "TA".

Figure 13:
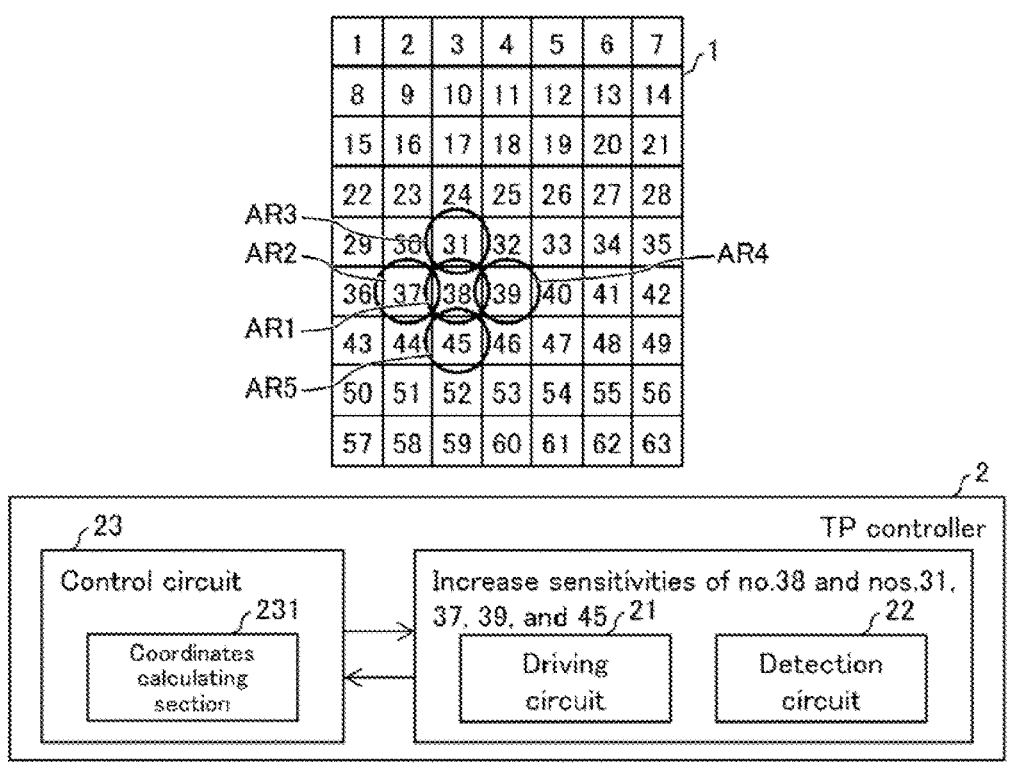

FIG. 13 is a view for explaining the operations of the electronic device in accordance with Embodiment 5 of the present invention.

Figure 14:
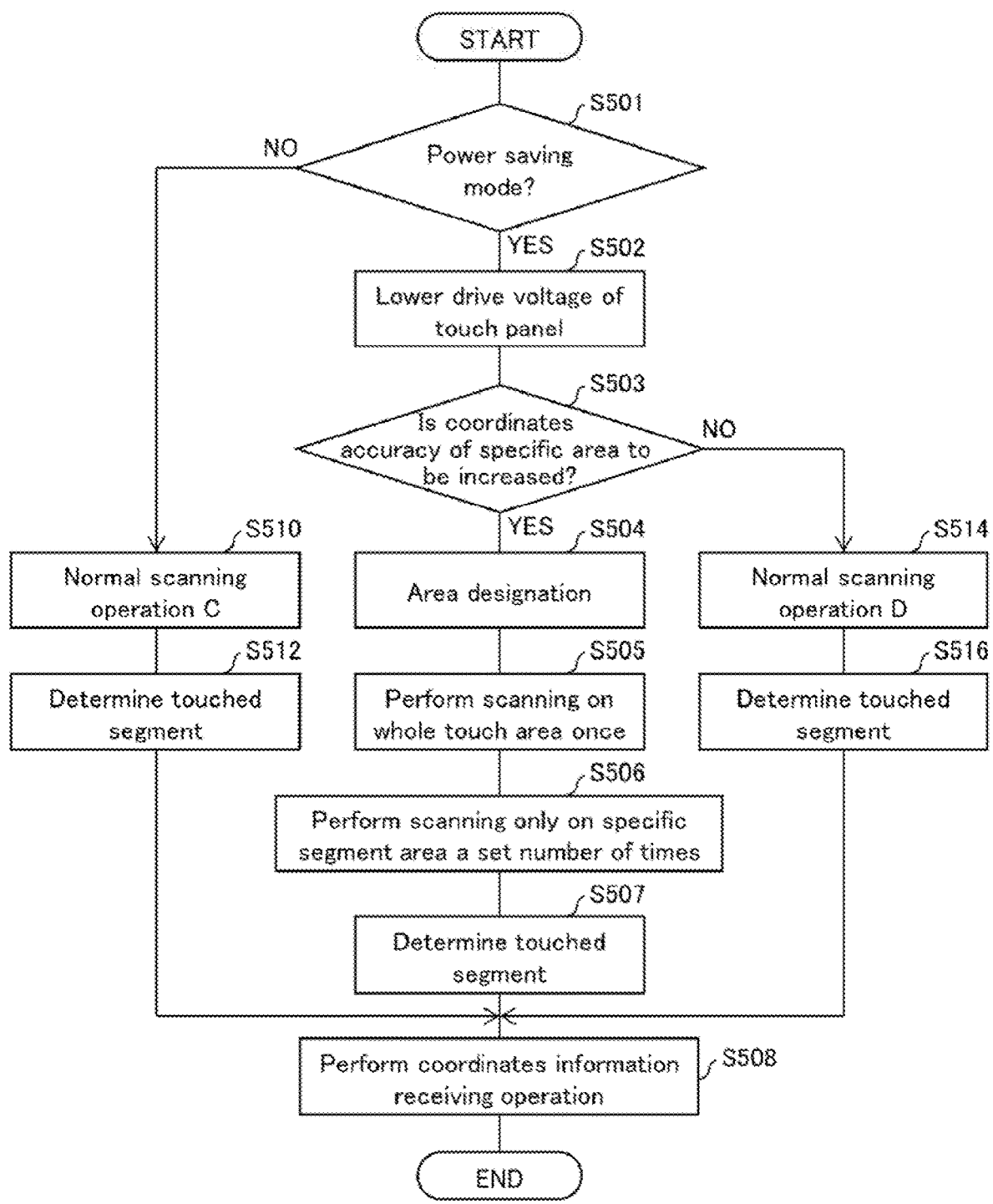

FIG. 14 is a flowchart illustrating the flow of the operations of the electronic device in accordance with Embodiment 5 of the present invention.

(a) of FIG. 15 is a view, relating to operations of an electronic device in accordance with Embodiment 6 of the present invention, illustrating that, when a given position on a map is touched, there is a high possibility that an operation performed by a user would be shifted to any of eight positions surrounding the given position, and (b) of FIG. 15 is a view for explaining the operations of the electronic device in accordance with Embodiment 6 of the present invention.

Figure 16:
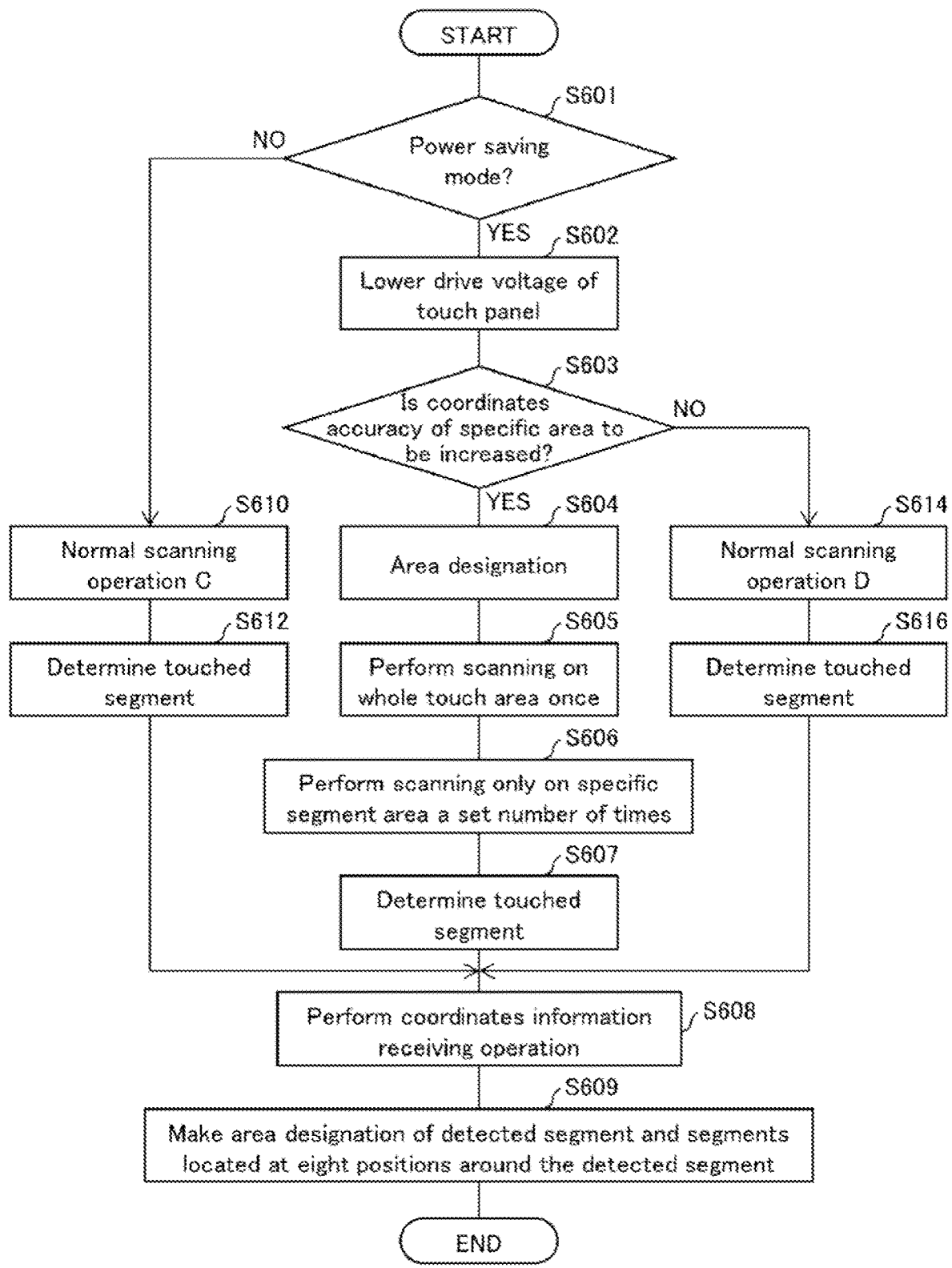

FIG. 16 is a flowchart illustrating the flow of the operations of the electronic device in accordance with Embodiment 6 of the present invention.

Figure 17:
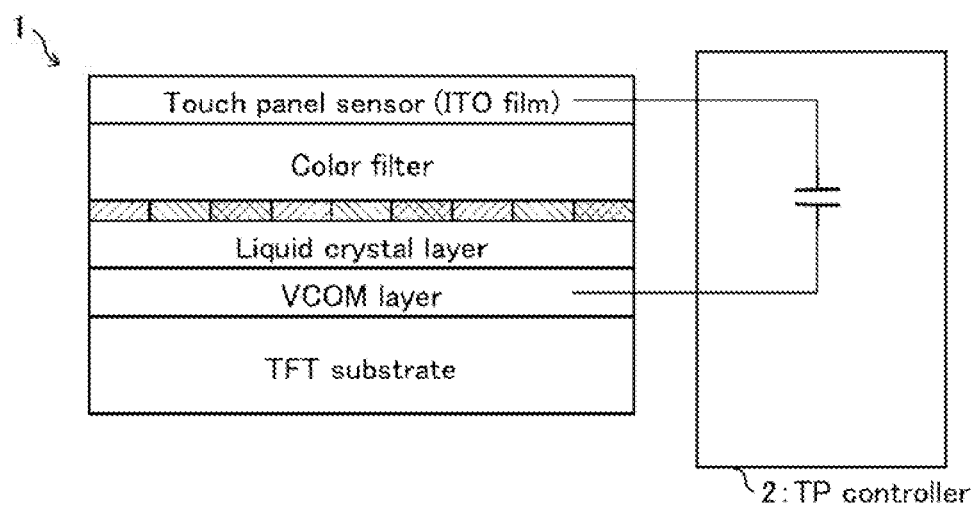

FIG. 17 is a block diagram illustrating the outline configuration of a segmented touch panel.

DESCRIPTION OF EMBODIMENTS

The following description will discuss embodiments of the present invention with reference to FIGS. 1 to 17. For convenience of description, any components that are identical in function to the components described in particular sections are assigned the same reference signs, and may not be described again.

Embodiment 1

Figure 1:
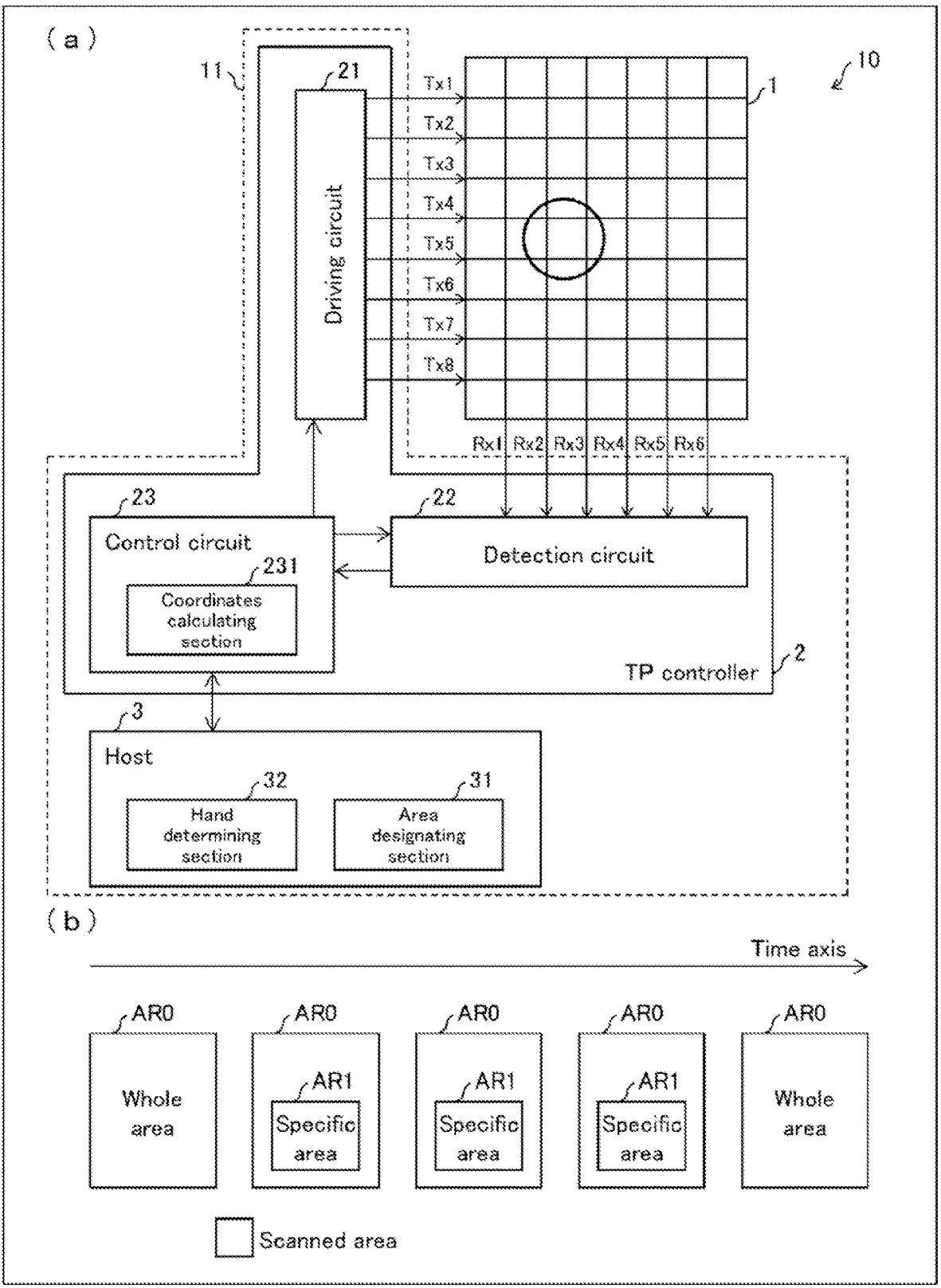

(a) of FIG. 1 is a block diagram illustrating the configuration of an electronic device 10 in accordance with Embodiment 1 of the present invention. As illustrated in (a) of FIG. 1, the electronic device 10 includes a touch panel 1 and a touch panel control device 11. Further, the touch panel control device 11 includes a TP controller (touch panel controller) 2 and a host 3. Note that the present invention can be applied to any electronic devices that include a touch panel. Examples of the electronic device include a mobile phone, a smart phone, a tablet device, and a portable gaming device.

The touch panel 1 has a structure in which a plurality of drive electrodes Tx1 to Tx8 and a plurality of detection electrodes Rx1 to Rx6 are arranged such that the drive electrodes Tx1 to Tx8 intersect with the detection electrodes Rx1 to Rx6 in a grade separation manner. Note that the description of Embodiment 1 discusses a case where the touch panel 1 employs a capacitive system using a capacitance. However, the touch panel 1 can alternatively employ any of various systems other than the capacitive system as a touch position detection system.

The TP controller 2 includes a driving circuit 21, a detection circuit 22, and a control circuit 23. The driving circuit 21 is connected to the plurality of drive electrodes Tx1 to Tx8 and applies a drive signal to the drive electrodes Tx1 to Tx8. Further, the driving circuit 21 in accordance with Embodiment 1 is capable of scanning a predetermined drive electrode(s) of the plurality of drive electrodes Tx1 to Tx8.

The detection circuit 22 is connected to the plurality of detection electrodes Rx1 to Rx6 and detects detection signals from the plurality of detection electrodes Rx1 to Rx6. Further, the detection circuit 22 is capable of scanning a predetermined detection electrode(s) of the plurality of detection electrodes Rx1 to Rx6.

The control circuit 23 controls the detection circuit 21 and the detection circuit 22. The control circuit 23 in accordance with Embodiment 1 controls the driving circuit 21 and the detection circuit 22 so that the driving circuit 21 and the detection circuit 22 perform scanning on a plurality of drive electrodes Tx1 to Tx8 and a plurality of detection electrodes Rx1 to Rx6, both of which construct a first area (for example, a whole area AR0) of the touch panel 1, and perform scanning at least once on part of the detection electrodes and part of the drive electrodes, both of which construct a second area (for example, a specific area AR1) within the first area, after the scanning on the first area has been performed but before a subsequent scanning on the first area is started.

Note that the description of Embodiment 1 discusses a case where the first area is set to be, for example, the whole area AR0 of the touch panel 1. However, the first area is not limited to the whole area AR0. For example, the first area can be set to be any area that includes the second area (specific area). Such an area can be of any size.

(b) of FIG. 1 is a conceptual diagram conceptually illustrating an example of an operation for scanning control of the touch panel 1 in the electronic device 10. In the example illustrated in (b) of FIG. 1, the driving circuit 21 and the detection circuit 22 are controlled to perform scanning three times on drive electrodes and detection electrodes both of which construct the specific area AR1 after one scanning on the whole area AR0 has been performed but before a subsequent scanning on the whole area AR0 is started.

Further, the control circuit 23 includes a coordinates calculating section 231. The coordinates calculating section 231 determines, based on a detection signal detected by the detection circuit 22, coordinates of a touch position at which a touch operation is performed on the touch panel 1. The coordinates calculating section 231 can determine the coordinates of the touch position by, for example, performing averaging processing on the detection signal which has been detected by the detection circuit 22 while scanning has been performed four times. This makes it possible to further improve the accuracy of detection of touch coordinates at which a touch operation is performed on the second area within the first area.

According to the above configuration, the control circuit 23 performs scanning on the second area within the first area at least once after one scanning on the first area has been performed but before a subsequent scanning of the first area is started. This allows for more data of detected coordinates for the touch operation performed on the second area, and thus reduces the influence of random noise. This makes it possible to improve the accuracy of detection of the touch coordinates in the second area, which touch coordinates are determined by the coordinates calculating section 231.

A host 3 (e.g., Central Processing Unit (CPU)) centrally controls the individual constituent components of the electronic device 10. The host 3 in accordance with Embodiment 1 includes an area designating section 31 and a hand determining section 32. The area designating section 31 designates the second area in a case where, for example, the electronic device 10 has been set into a power saving mode. The power saving mode refers to, for example, a state in which, when a battery is running low, a drive voltage of the touch panel 1 is lowered uniformly to prolong life of the battery. This mode provides a longer life of the battery.

Note that the description of Embodiment 1 discusses an embodiment in which the area designating section 31 makes designation of a specific area (second area). However, an embodiment of the present invention is not limited to such an embodiment. In one embodiment, the first area and the second area can be preset. Such an embodiment eliminates the need for the area designating section 31 to make designation of the specific area. The hand determining section 32 determines whether a hand holding the electronic device 10 is a right hand or a left hand. Note that the hand determining section 32 will be discussed in detail in Embodiment 2.

Figure 2:
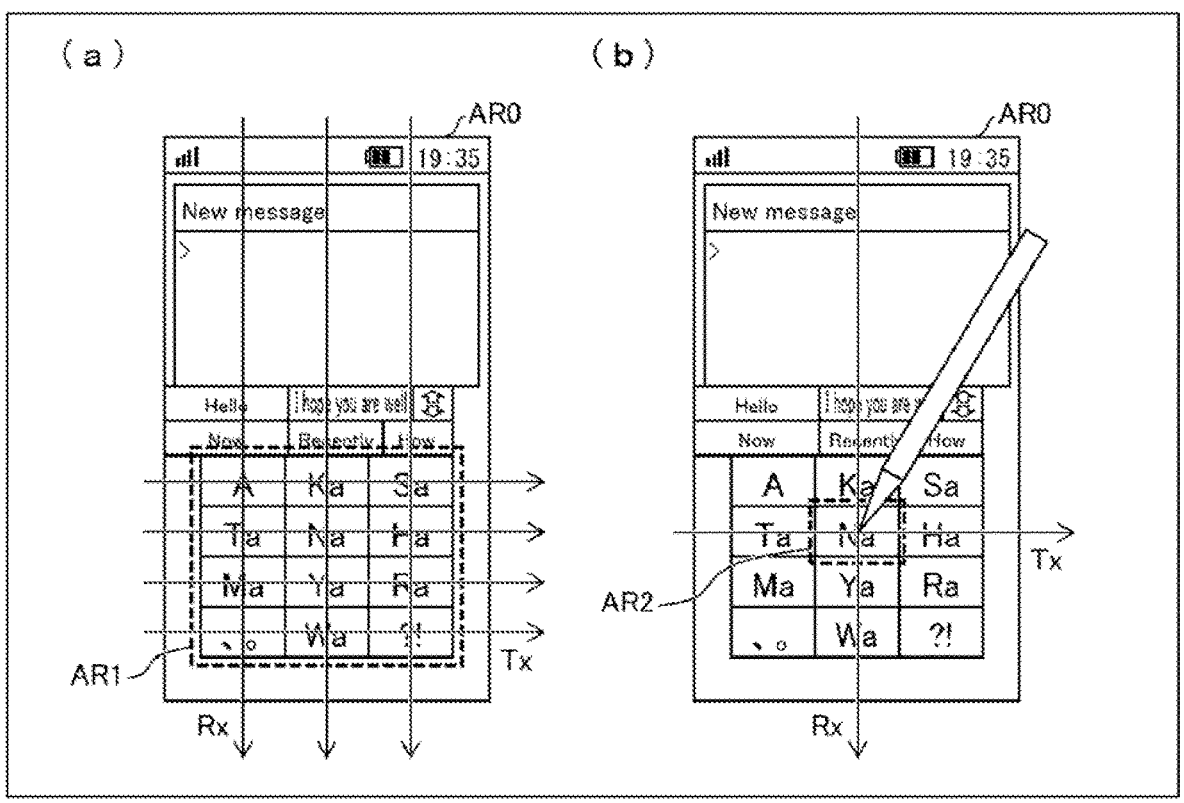

Next, the following will discuss an example of setting of the specific area (second area) with reference to FIG. 2. As illustrated in (a) of FIG. 2, only a portion in which character input operation keys are displayed on an e-mail message input screen can be designated as the specific area (AR1). This is because, on the e-mail message input screen, there is a high possibility that a finger of a user or the like touches the portion (specific area) in which the character input operation keys are displayed. Alternatively, as illustrated in (b) of FIG. 2, in a case where a touch pen is in contact with a specific character input operation key, an area of such a specific character input operation key with which the touch pen is in contact can be designated as the specific area (AR2).

Figure 3:
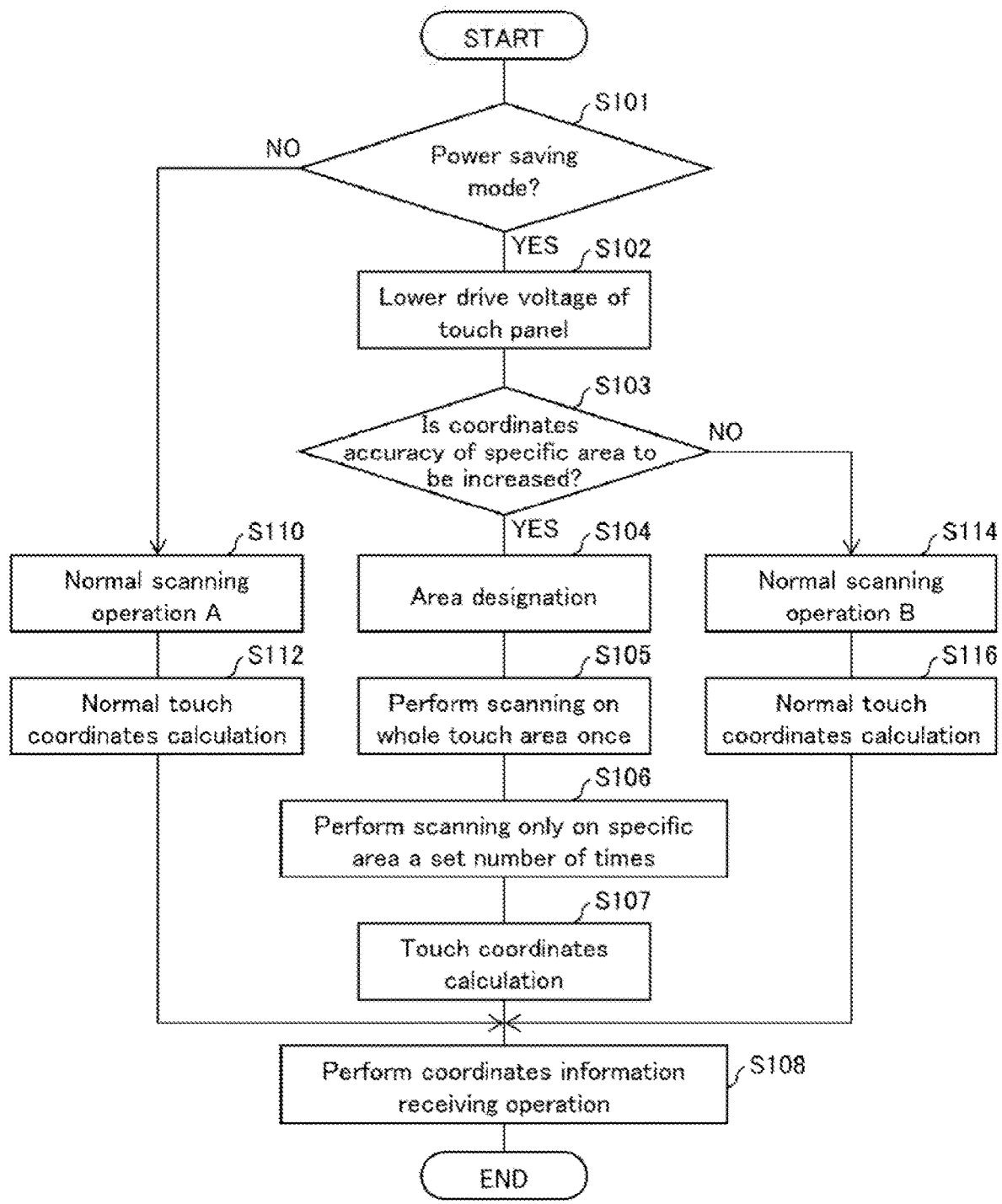

Next, the following will discuss operations of the electronic device 10 in accordance with Embodiment 1 of the present invention with reference to FIG. 3. FIG. 3 is a flowchart illustrating the flow of the operations of the electronic device 10 in accordance with Embodiment 1.

First, in step (hereinafter the word "step" will be abbreviated to "S") 101, the host 3 determines whether the electronic device 10 is set into the power saving mode. In a case where the host 3 determines that the electronic device 10 is set into the power saving mode, the process proceeds to S102. In S101, in a case where the host 3 determines that the electronic device 10 is not set into the power saving mode, the process proceeds to S110. In S110, scanning is performed once on the whole touch area (whole area AR0) at a normal drive voltage (normal scanning operation A), and touch coordinates calculation (normal touch coordinates calculation) is then performed in S112. Then, the process proceeds to S108.

In S102, the host 3 controls the TP controller 2 to lower the drive voltage of the touch panel 1, and the process proceeds to S103. Lowering the drive voltage for power saving of the touch panel 1 in such a manner can cause a poor S/N ratio and increase susceptibility to noise. As described later, performing scanning at least once on only a specific area makes it possible to improve the coordinates accuracy and reduce power consumption of the entire device.

In S103, the host 3 determines whether or not the coordinates accuracy of the specific area is to be improved. In a case where the host 3 determines that the coordinates accuracy of the specific area is to be improved, the process proceeds to S104. On the other hand, in a case where the host 3 determines that the coordinates accuracy of the specific area is not to be improved, the process proceeds to S114. In S114, scanning is performed once on the whole touch area (whole area AR0) at a low drive voltage (normal scanning operation B), and touch coordinates calculation (normal touch coordinates calculation) is then performed in S116. Then, the process proceeds to S108. In S104, the area designating section 31 of the host 3 makes designation of the specific area (second area) within the whole area (first area) of the touch panel 1, and the process proceeds to S105.

In S105, scanning is performed once on the whole touch area (whole area AR0), and the process proceeds to S106. In S106, before a subsequent scanning on the whole area of the touch panel 1 is started, the driving circuit 21 and the detection circuit 22 perform scanning on only the specific area (second area) a set number of times. Then, the process proceeds to S107.

In S107, the coordinates calculating section 231 performs averaging processing based on a detection signal detected by the detection circuit 22 to determine coordinates of a touch position on the touch panel 1. Then, the process proceeds to S108. In S108, the host 3 receives coordinates information from the control circuit 23. This is the "END" of one scanning operation period.

In the above operation, in a case where only the specific area requires the coordinates accuracy when the power saving mode has been turned on, a series of operations are carried out as discussed above. That is, the area designating section 31 of the host 3 makes designation of a specific area, the driving circuit 21 and the detection circuit 22 of the TP controller 2 perform scanning on the drive electrodes Tx and the detection electrodes Rx both of which construct the specific area, and the coordinates calculating section 231 of the TP controller 2 performs averaging processing on the received coordinates and then transmits the coordinates information to the host 3.

Embodiment 2

Figure 4:
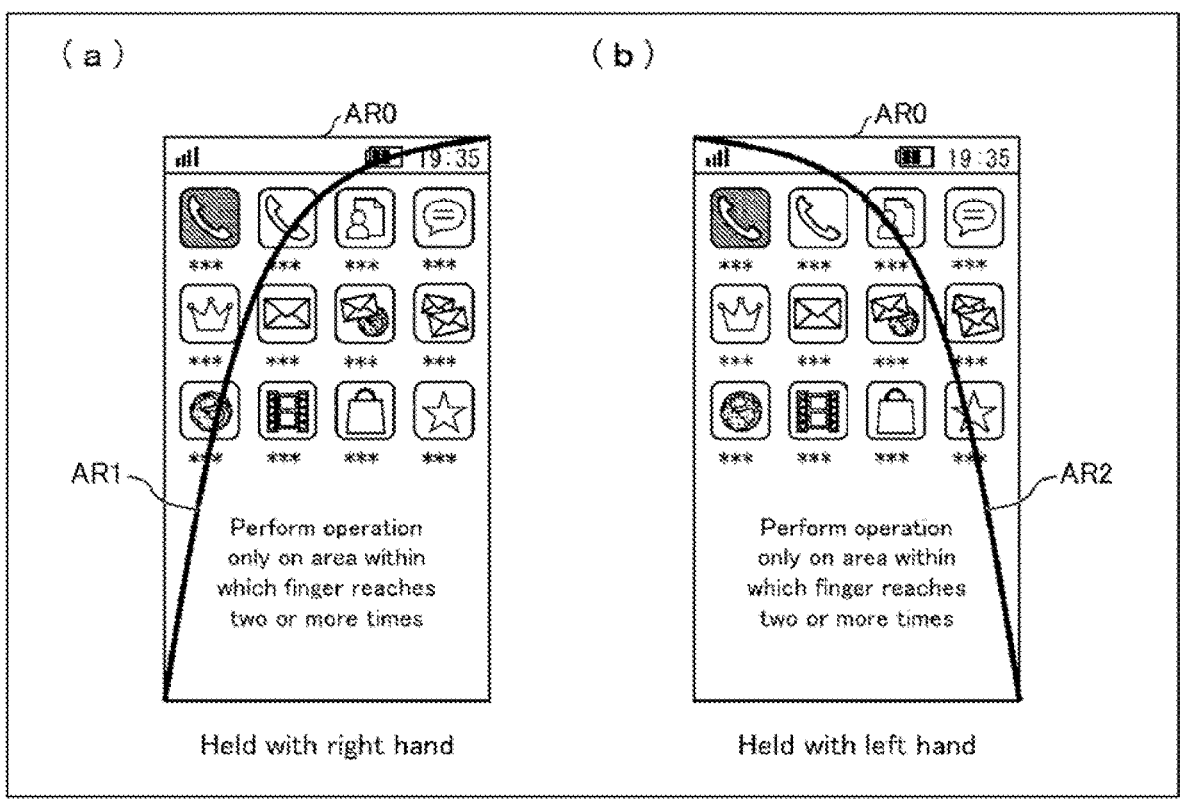

Next, (a) of FIG. 4 is a view, relating to the operations of an electronic device 10 in accordance with Embodiment 2 of the present invention, illustrating an example case where an area within which a finger reaches in a situation where the electronic device 10 is held with a right hand is designated as a second area (specific area AR1). Meanwhile, (b) of FIG. 4 is a view illustrating an example case where an area within which a finger reaches in a situation where the electronic device 10 is held with a left hand is designated as the second area (specific area AR2). Note that AR0 indicates the whole area (first area) of the touch panel 1.

Figure 5:
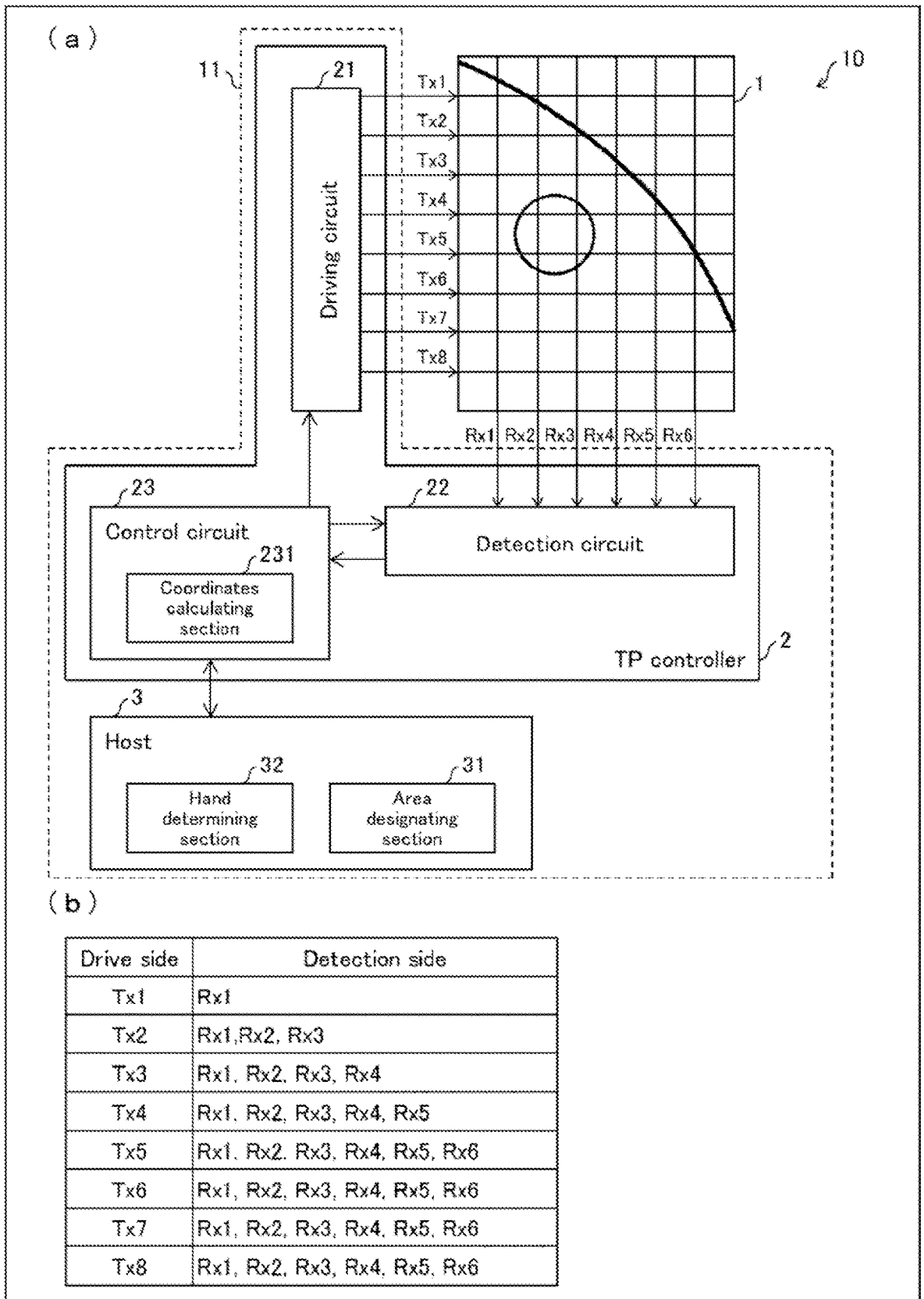

(a) of FIG. 5 is a block diagram illustrating the configuration of the electronic device 10 in accordance with Embodiment 2 of the present invention. Further, (b) of FIG. 2 is a diagram illustrating an example of combinations of electrodes to be scanned in the specific area (in a situation where the electronic device 10 is held with a left hand).

Embodiment 2 differs from Embodiment 1 in that a hand determining section 32 determines whether a hand holding the electronic device 10 is a right hand or a left hand, and an area designating section 31 changes from a range designated for the second area to another area according to a result of the determination performed by the hand determining section 32 (see (a) and (b) of FIG. 4).

Examples of a hand determination method performed by the hand determining section 32 include the following methods (1) to (3):

(1) A determination method using a grip sensor:

A plurality of sensors provided on left and right side surfaces of the electronic device 10 (hereinafter may be referred to simply as "device") are used to determine whether the device is held with a left hand or a right hand by taking advantage of a difference in number of sensors that respond between when a thenar region of a hand contacts the side surfaces of the device and when finger tips contact the side surfaces of the device in a state in which the device is held with the left hand or the right hand.

(2) A determination method using detected coordinates on the touch panel 1:

Determination is made as to whether the device is held with a left hand or a right hand by taking advantage of a difference in region for detection of coordinates on the touch panel 1 between a portion where a ball of a finger contacts and a portion where a finger contacts in a state in which the device is held with the left hand or the right hand.

(3) A determination method using an acceleration sensor:

An angle at which a device is tilted is different between when the device is held with a right hand and when the device is held with a left hand. Determination is made by using an acceleration sensor which detects an angle at which a device is tilted in a state of being held with a right hand or a left hand. For example, the device being held with a left hand tends to be tilted to the right with respect to its horizontal position. Further, the device being held with a right hand tends to be tilted to the left with respect to its horizontal position. Thus, by taking advantage of these tendencies, determination is made as to whether the device is held with a left hand or a right hand.

Figure 6:
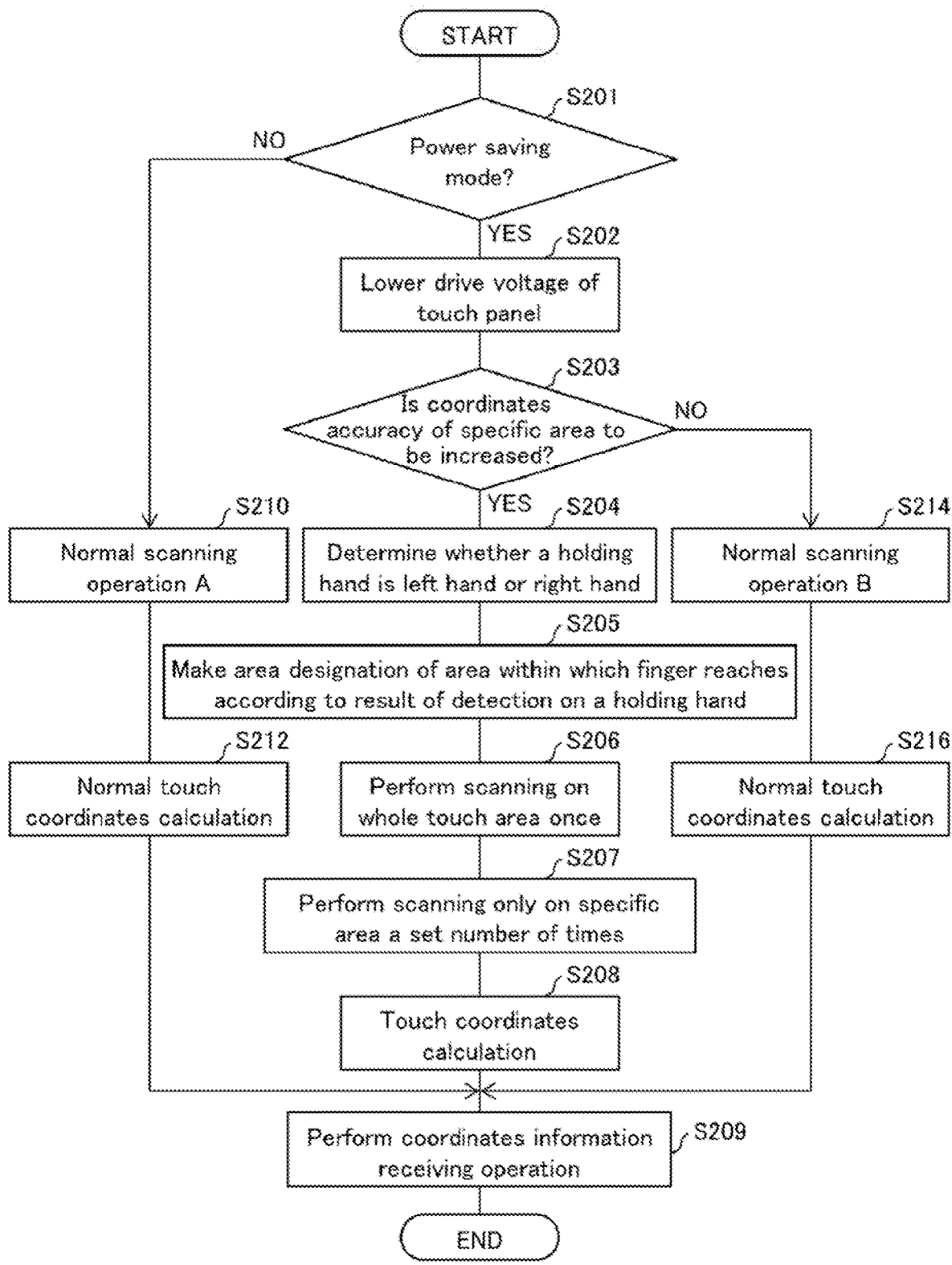

Next, the following will discuss operations of the electronic device 10 in accordance with Embodiment 2 of the present invention with reference to FIG. 6. FIG. 6 is a flowchart illustrating the flow of the operations of the electronic device 10 in accordance with Embodiment 2. The operations in S201, S202, S203, S210, S212, S214, and S216 are the same as the operations in S101, S102, S103, S110, S112, S114, and S116 discussed above, respectively, and are not discussed again here.

In S204, the hand determining section 32 determines whether a hand holding the electronic device 10 is a left hand or a right hand. Then, the process proceeds to S205. In S205, the area designating section 31 designates an area within which a finger can reach as a specific area (second area) according to a result of the determination on a hand holding the electronic device 10 (detection result). Then, the process proceeds to S206.

In S206, scanning is performed once on the whole touch area (whole area AR0), and the process proceeds to S207. In S207, before a subsequent scanning on the whole area of the touch panel 1 is started, the driving circuit 21 and the detection circuit 22 perform scanning on only the specific area (second area) a set number of times. Then, the process proceeds to S208.

In S208, the coordinates calculating section 231 performs averaging processing based on a detection signal detected by the detection circuit 22 to determine coordinates of a touch position on the touch panel 1. Then, the process proceeds to S209. In S209, the host 3 receives coordinates information from the control circuit 23. This is the "END" of one scanning operation period.

In the above operation, in a case where only the specific area requires the coordinates accuracy when the power saving mode has been turned on, a series of operations are carried out as follows. That is, the hand determining section 32 determines a hand holding the electronic device 10, the area designating section 31 designates an area within which each finger and a thumb can reach as a specific area, the driving circuit 21 and the detection circuit 22 of the TP controller 2 perform scanning on a combination of the drive electrodes Tx and the detection electrodes Rx in the specific area shown in (b) of FIG. 5, and the coordinates calculating section 231 of the TP controller 2 performs averaging processing on the received coordinates and then transmits the coordinates information to the host 3.

Embodiment 3

Figure 8:
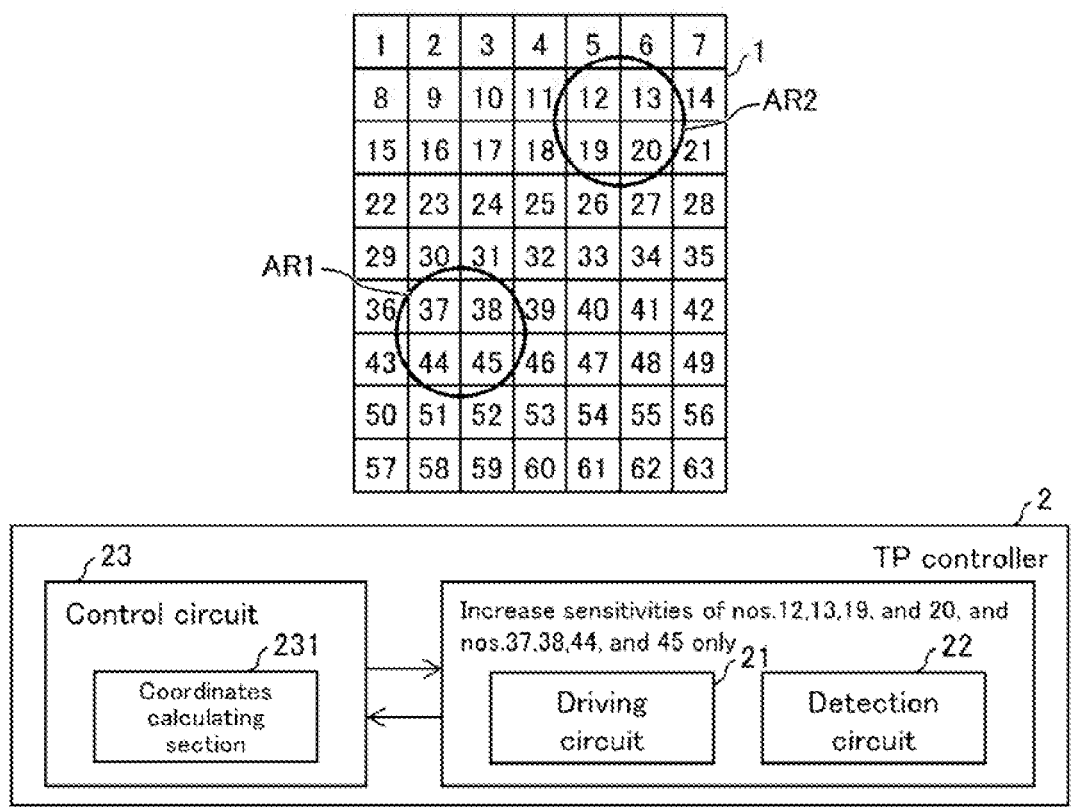
FIG. 8 is a view for explaining the operations of the electronic device in accordance with Embodiment 3 of the present invention.
Figure 9:
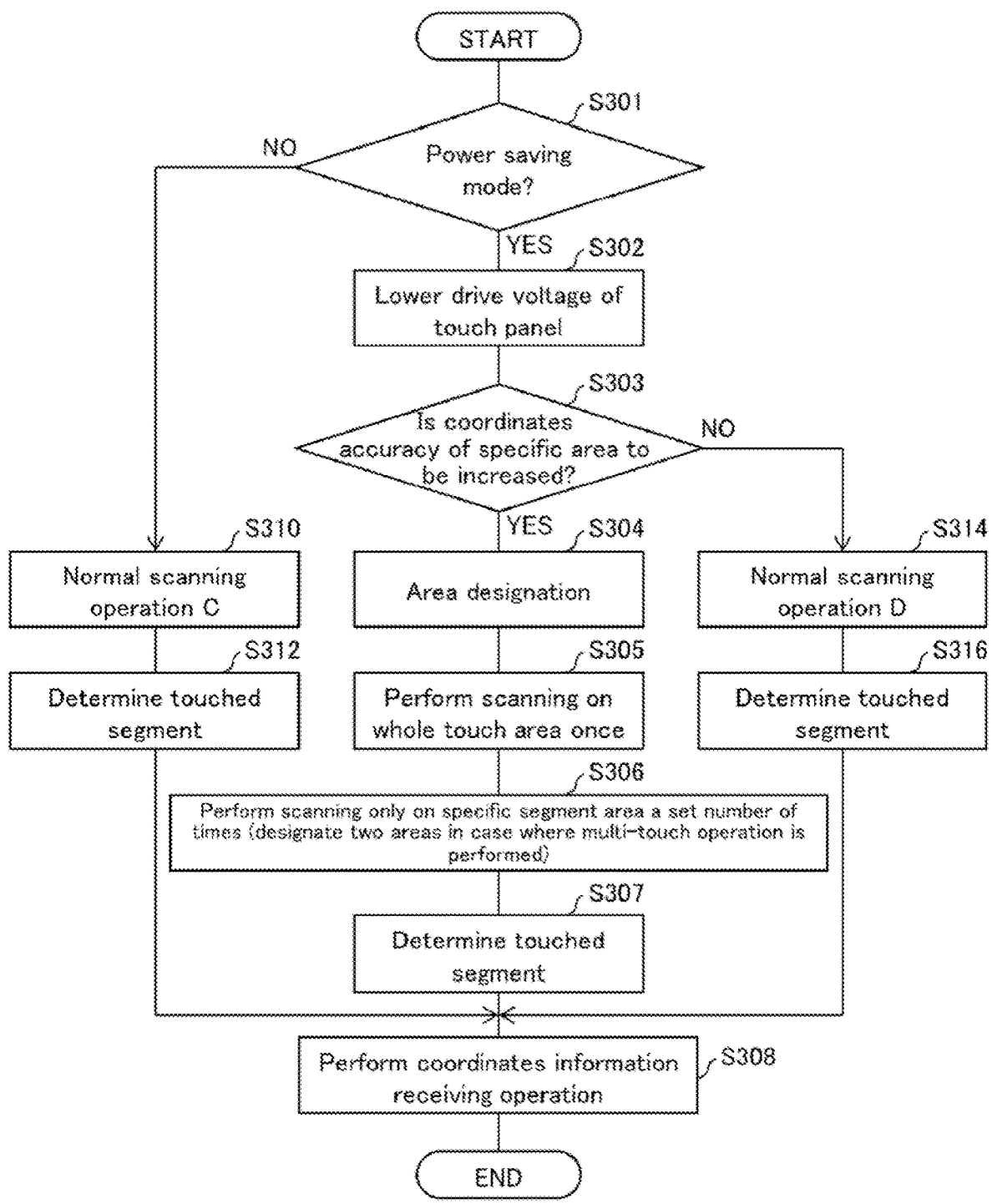
FIG. 9 is a flowchart illustrating the flow of the operations of the electronic device in accordance with Embodiment 3 of the present invention.

Next, the following will discuss operations of an electronic device 10 in accordance with Embodiment 3 of the present invention with reference to FIGS. 7 to 9. The electronic device 10 in accordance with Embodiment 3 differs from the electronic devices discussed above in Embodiments 1 and 2 in that the electronic device 10 in accordance with Embodiment 3 includes a so-called segmented touch panel 1.

In Embodiment 3, the segmented touch panel 1 is capable of performing operations that are similar to the operations discussed above in Embodiments 1 and 2. As an example of the segmented touch panel, take an active area of the touch panel 1. The active area is divided into, for example, a plurality of segments (cells) Nos. 1 to 63 as illustrated in (a) of FIG. 7, and each of the segments is connected directly to the TP controller 2.

Here, the outline configuration and operation principle of the segmented touch panel 1 in accordance with Embodiment 3 will be discussed with reference to FIG. 17. FIG. 17 is a block diagram illustrating the outline configuration of the segmented touch panel 1. In the segmented touch panel 1 in accordance with Embodiment 3, the individual cells are connected to the TP controller 2 on a one-to-one basis. The segmented touch panel 1, which is used mainly in in-cell touch panel, operates on an operation principle as below. The in-cell touch panel includes a liquid crystal color filter and an indium tin oxide (ITO) film formed on the liquid crystal color filter. As illustrated in FIG. 17, a touch on the touch panel 1 causes a change in capacitance between each cell portion and a common electrode (VCOM) layer in the touch panel 1. Coordinates at which such a change occurs are read. In this method, scanning is performed from above the VCOM layer.

Next, (a) of FIG. 7 is a view illustrating the operations of the electronic device 10 when the area designating section 31 designates a segment No. 25 as a specific area (second area) AR1 (in a case where only this area is increased in sensitivity). In this embodiment, the number of times scanning is performed is increased only for the segment No. 25.

Next, (b) of FIG. 7 is a view illustrating the operations of the electronic device 10 when the area designating section 31 designates segments Nos. 26, 27, 33, and 34 as a specific area (second area) AR2 (in a case where only this area is increased in sensitivity). In this embodiment, a plurality of segments (cells), i.e., the segments Nos. 26, 27, 33, and 34, are designated, and the number of times scanning is performed is increased only for these segments.

Next, FIG. 8 is a view illustrating the operations of the electronic device 10 when segments Nos. 37, 38, 44, and 45 are designated as a specific area (second area) AR1 and segments Nos. 12, 13, 19, and 20 are designated as a specific area (second area) AR2 (in a case where the sensitivity of only these areas is increased). As in this embodiment, a plurality of areas can be designated (in a case where a multi-touch operation is performed).

Next, the following will discuss operations of the electronic device 10 in accordance with Embodiment 3 of the present invention with reference to FIG. 9. FIG. 9 is a flowchart illustrating the flow of the operations of the electronic device 10 in accordance with Embodiment 3. Note that the operation in S302 is the same as the operation in S102 discussed above and is not discussed again here.

In S301, in a case where the electronic device 10 is not set into the power saving mode, the process proceeds to S310. In S310, scanning is performed once on the whole touch area (whole area AR0) at a normal drive voltage (normal scanning operation C). In S312, a segment corresponding to a touch position on the touch panel 1 is determined based on a detection signal detected by the detection circuit 22. Then, the process proceeds to S308.

In S303, the host 3 determines whether or not the coordinates accuracy of the specific area is to be improved. In a case where the host 3 determines that the coordinates accuracy of the specific area is to be improved, the process proceeds to S304. On the other hand, in a case where the host 3 determines that the coordinates accuracy of the specific area is not to be improved, the process proceeds to S314. In S314, scanning is performed once on the whole touch area (whole area AR0) at a low drive voltage (normal scanning operation D). In S316, a segment corresponding to a touch position on the touch panel 1 is determined based on a detection signal detected by the detection circuit 22. Then, the process proceeds to S308.

In S304, the area designating section 31 of the host 3 designates, as the specific area, an area containing at least one specific segment (in a case where a multi-touch operation is performed, the area designating section 31 of the host 3 designates, for example, a plurality of specific areas AR1 and AR2, as illustrated in FIG. 8), and the process proceeds to S305.

In S305, first, the control circuit 23 causes the driving circuit 21 and the detection circuit 22 to perform scanning on segments making up the whole area of the touch panel 1. Thereafter, in S306, before a subsequent scanning on the whole area of the touch panel 1 is started, the driving circuit 21 and the detection circuit 22 perform scanning on only a segment(s) of the specific area a set number of times (in a case where a multi-touch operation is performed, the driving circuit 21 and the detection circuit 22 perform scanning on, for example, a plurality of specific areas AR1 and AR2, as illustrated in FIG. 8). Then, the process proceeds to S307.

In S307, averaging processing is performed based on a detection signal detected by the detection circuit 22 to determine a segment(s) of a touch position on the touch panel 1. Then, the process proceeds to S308.

Note that the operation in S308 is the same as the operation in S108 discussed above and is not discussed again here.

Embodiment 4

Next, the following will discuss operations of an electronic device 10 in accordance with Embodiment 4 of the present invention with reference to FIGS. 10 and 11. In Embodiment 4, the following will discuss an embodiment in which an expectation is made on a direction in which a finger in contact with the touch panel 1 moves, and the number of segments (cells) to be increased in sensitivity is increased in the direction in which the finger is expected to move.

Note that the description of Embodiment 4 will take the so-called segmented touch panel as an example. It is, however, needless to say that an arrangement discussed in Embodiment 4 can also be applied to a matrix touch panel as in Embodiments 1 and 2.

(a) of FIG. 10 is a view for explaining, as an example, an up and down scrolling operation which is expected to be performed during the browsing of a specific webpage. It is needless to say that directions in which a finger is expected to move (e.g., an upward direction, a downward direction, a left direction, a right direction, diagonally upward directions, and diagonally downward directions) can be set according to content displayed. In Embodiment 4, segments located on the top and bottom of a segment located at a position corresponding to initially obtained coordinates are increased in sensitivity (are improved in coordinates accuracy), from the expectation that a user who is browsing a webpage mainly scrolls the screen up and down. (b) of FIG. 10 is a view for explaining operations of the electronic device 10 in accordance with Embodiment 4 of the present invention. As illustrated in (b) of FIG. 10, in a case where the last touch position corresponds to a segment No. 25, segments Nos. 18 and 32, which are located on the top and bottom of the segment No. 25, are increased in sensitivity in order to predict a direction in which a finger moves (these segments are designated as the specific area). As a result, the specific area (second area) dr1 becomes an area containing the segments Nos. 18, 25, and 32. Then, for example, in a case where it is detected that the finger has moved from the segment No. 25 to the segment No. 32, an area to be set to have a high accuracy of detection is shifted such that AR1 is changed to the segment No. 32, and the specific area dr1 is changed to an area containing the segments Nos. 25, 32, and 39.

Note that although the above description has discussed that the segments to be increased in sensitivity are set to be one upper segment and one lower segment, the present invention is not limited to such an arrangement. Alternatively, the segments to be increased in sensitivity can be set to be two or more upper segments and two or more lower segments, or alternatively, either one or more upper segments or one or more lower segments which are located on the side toward which a finger moves.

Next, the following will discuss the operations of the electronic device 10 in accordance with Embodiment 4 of the present invention with reference to FIG. 11. FIG. 11 is a flowchart illustrating the flow of the operations of the electronic device 10 in accordance with Embodiment 4. The operations in S401 to S403, S410, S412, S414, and S416 are the same as the operations in S101 to S103, S310, S312, S314, and S316 discussed above, respectively, and are not discussed again here.

In S404, the area designating section 31 of the host 3 designates, as the specific area, an area containing one specific segment. Then, the process proceeds to S405. A method of designating the specific area is, for example, such that in a case where the last touch position corresponds to the segment No. 25 as described above, the segments Nos. 18 and 32, which are located on the top and bottom of the segment No. 25, are designated as the specific area. In S405, first, the control circuit 23 causes the driving circuit 21 and the detection circuit 22 to perform scanning on segments constituting the whole area of the touch panel 1. Thereafter, before a subsequent scanning on the whole area of the touch panel 1 is started, the driving circuit 21 and the detection circuit 22 perform scanning on only the segments of the specific area a set number of times. Then, the process proceeds to S407.

The operations in S407 and S408 are the same as the operations in S307 and S308 discussed above, respectively, and are not discussed again here. In S409, the area designating section 31 of the host 3 designates, as the specific area, a segment detected as being currently touched and segments located on the top and bottom of the segment thus detected. This is the "END" of one scanning operation period. Then, settings are made such that the specific area designated in S409 is used in a subsequent scanning operation period.

Embodiment 5

Next, the following will discuss operations of an electronic device 10 in accordance with Embodiment 5 of the present invention with reference to FIGS. 12 to 14. In Embodiment 5, the following will discuss an embodiment in which, in a case where a character representing a vowel is pressed during the inputting of characters, four segments surrounding the segment corresponding to the character representing the vowel are increased in sensitivity (improved in coordinates accuracy).

(a) of FIG. 12 is a view illustrating a state in which a character input operation key "TA" is selected. At this stage, an area of twelve character input operation keys including the character input operation key "TA" is designated as a specific area.

Then, when the character input operation key "TA" is touched, the character input operation key "TA" and character input operation keys "TI", "TSU", "TE", and "TO" appear at positions different from the position at which the touch is performed, as illustrated in (b) of FIG. 12. The character input operation keys "TI", "TSU", "TE", and "TO" appear on the left, right, top, and bottom of the character input operation key "TA". At this stage, the area designating section 31 designates, as the specific area, specific areas (second area) AR1 to AR5 containing the character input operation key "TA" at the center and the character input operation keys "TI", "TSU", "TE", and "TO", which are located around the character input operation key "TA" at the four positions on the left, right, top, and bottom of the character input operation key "TA".

FIG. 13 is a view, in correspondence with (b) of FIG. 12, for explaining operations of the electronic device 10 in accordance with Embodiment 5 of the present invention. As illustrated in FIG. 13, the segment No. 38 corresponding to the character input operation key "TA" and the segments Nos. 31, 37, 39, and 45 corresponding to the character input operation keys "TI", "TSU", "TE", and "TO", which are located on the left, right, top, and bottom of the character input operation key "TA" are increased in the sensitivity (these segments are designated as the specific area). As a result, the specific areas AR1 to AR5 become an area containing the segments Nos. 31, 37, 38, 39, and 45.

Next, the following will discuss the operations of the electronic device 10 in accordance with Embodiment 5 of the present invention with reference to FIG. 14. FIG. 14 is a flowchart illustrating the flow of the operations of the electronic device 10 in accordance with Embodiment 5. The operations in S501 to S503, S510, S512, S514, and S516 are the same as the operations in S101 to S103, S310, S312, S314, and S316 discussed above, respectively, and are not discussed again here.

In S504, the area designating section 31 of the host 3 designates, as the specific area, an area containing one specific segment. Then, the process proceeds to S505. In S505, first, the control circuit 23 causes the driving circuit and the detection circuit 22 to perform scanning on segments constituting the whole area of the touch panel 1. Thereafter, before a subsequent scanning on the whole area of the touch panel 1 is started, the driving circuit 21 and the detection circuit 22 perform scanning on only the segments of the specific area a set number of times in S506. Then, the process proceeds to S507.

The operations in S507 and S508 are the same as the operations in S307 and S308 discussed above, respectively, and are not discussed again here. In this way, one scanning operation period comes to "END".

Embodiment 6

Next, the following will discuss operations of an electronic device 10 in accordance with Embodiment 6 of the present invention with reference to FIGS. 15 and 16. In Embodiment 6, the following will discuss an embodiment in which, from the expectation that a finger of a user who is viewing a map moves to any of eight segments surrounding a central segment (centered segment), eight segments surrounding a segment located at a position corresponding to initially obtained coordinates are increased in sensitivity (improved in coordinates accuracy).

(a) of FIG. 15 is a view illustrating that, when a given position (specific area (second area) AR1) on a map is touched, it is highly likely that an operation performed by a user is shifted to any of eight positions (specific area (second area) dr1 to dr8) surrounding the given position. In this embodiment, the area designating section 31 designates, as the specific area, the specific area AR1 containing the last touch position on the map and the specific areas dr1 to dr8 located at the eight positions surrounding the specific area AR1.

(b) of FIG. 15 is a view for explaining operations of the electronic device 10 in accordance with Embodiment 6. As illustrated in (b) of FIG. 15, in a case where the last touch position corresponds to the segment No. 32, the segments Nos. 24, 25, 26, 31, 33, 38, 39, and 40, which are located at eight positions surrounding the segment No. 32, are increased in sensitivity (these segments are designated as the specific area). As a result, the specific area AR1 and the specific areas dr1 to dr8 become an area containing the segments Nos. 24, 25, 26, 31, 32, 33, 38, 39, and 40.

Next, the following will discuss the operations of the electronic device 10 in accordance with Embodiment 6 of the present invention with reference to FIG. 16. FIG. 16 is a flowchart illustrating the flow of the operations of the electronic device 10 in accordance with Embodiment 6. The operations in S601 to S603, S610, S612, S614, and S616 are the same as the operations in S101 to S103, S310, S312, S314, and S316 discussed above, respectively, and are not discussed again here.

In S604, the area designating section 31 of the host 3 designates, as the specific area, an area containing one specific segment. Then, the process proceeds to S605. In S605, first, the control circuit 23 causes the driving circuit 21 and the detection circuit 22 to perform scanning on segments constituting the whole area of the touch panel 1. Thereafter, before a subsequent scanning on the whole area of the touch panel 1 is started, the driving circuit 21 and the detection circuit 22 perform scanning on only the segments of the specific area a set number of times. Then, the process proceeds to S607.

The operations in S607 and S608 are the same as the operations in S307 and S308 discussed above, respectively, and are not discussed again here. In S609, the area designating section 31 of the host 3 designates, as the specific area, a segment detected as being currently touched and eight segments surrounding the segment thus detected. This is the "END" of one scanning operation period. Then, settings are made such that the specific area designated in S609 is used in a subsequent scanning operation period.

In Embodiments 1 to 6 above, the case where the embodiments of the present invention are implemented to lower the drive voltage of the touch panel in the power saving mode has been discussed as an example. However, the present invention is not limited to such a case. It is apparent that the present invention can be applied to a case where the electronic device 10 is not in the power saving mode and to a case where the drive voltage is not lowered.

[Recap]

A touch panel control device (11) in accordance with a first aspect of the present invention includes: a driving circuit (21) configured to apply a drive signal to a plurality of drive electrodes of a touch panel (1); a detection circuit (22) configured to detect a detection signal from a plurality of detection electrodes of the touch panel; a control circuit (23) configured to control the driving circuit and the detection circuit; and a coordinates calculating section (231) configured to determine coordinates of a touch position on the touch panel based on the detection signal detected by the detection circuit, the driving circuit being capable of scanning a predetermined drive electrode of the plurality of drive electrodes, the detection circuit being capable of scanning a predetermined detection electrode of the plurality of detection electrodes, the control circuit controlling the driving circuit and the detection circuit so that the driving circuit and the detection circuit perform scanning on the plurality of drive electrodes and the plurality of detection electrodes, both of which construct a first area of the touch panel, and perform scanning at least once on part of the plurality of detection electrodes and part of the plurality of drive electrodes, both of which construct a second area within the first area, after the scanning on the first area has been performed but before a subsequent scanning on the first area is started.

According to the above configuration, the control circuit performs scanning at least once on the second area within the first area, after the scanning on the first area has been performed but before a subsequent scanning on the first area is started. This allows for more data of detected coordinates for a touch operation performed on the second area and thus makes it possible to improve the accuracy of detection of touch coordinates in the second area, which touch coordinates are determined by the coordinates calculating section. Furthermore, it is possible to reduce power consumed by a device as a whole in comparison with the technique disclosed in Patent Literature 1, i.e., the technique of performing scanning on the whole area of the touch panel and increasing the scanning frequency only for a specific area. Thus, it is possible to improve the accuracy of detection of touch coordinates in the second area within the first area while reducing power consumed by a device as a whole.

In a second aspect of the present invention, the touch panel control device can be arranged such that, in the first aspect of the present invention, the coordinates calculating section determines the coordinates of the touch position by performing averaging processing on the detection signal detected by the detection circuit. According to the above configuration, it is possible to further improve the accuracy of detection of touch coordinates in the second area within the first area.

In a third aspect of the present invention, the touch panel control device can be arranged such that, in the first or second aspect of the present invention, the touch panel control device further includes: an area designating section (31) configured to make designation of the second area, the control circuit performing scanning on the second area in a case where the area designating section has made designation of the second area. According to the above configuration, it is possible to designate a range of the second area to be improved in accuracy of detection of touch coordinates.

In a fourth aspect of the present invention, the touch panel control device can be arranged such that, in the third aspect of the present invention, the area designating section makes designation of the second area in a case where a power saving mode has been turned on. According to the above configuration, it is possible to improve the accuracy of detection of touch coordinates in the second area within the first area in a situation where the power saving mode has been turned on.

In a fifth aspect of the present invention, the touch panel control device can be arranged such that, in the third or fourth aspect of the present invention, the touch panel is divided into a plurality of segments, and the area designating section designates, as the second area, at least one segment out of the plurality of segments. The above configuration allows a segmented touch panel to improve the accuracy of detection of touch coordinates in the second area within the first area while reducing power consumed by a device as a whole.

In a sixth aspect of the present invention, the touch panel control device can be arranged such that, in the fifth aspect of the present invention, the area designating section designates, as the second area, (i) one segment out of the plurality of segments and (ii) another at least one segment which exists around the one segment. In a case where a touch position on the touch panel is contained in one segment, it is highly likely that the touch position moves to another segment which exists around the one segment. Thus, according to the above configuration, one segment and another segment which exists around the one segment are designated as the second area. This makes it possible to improve the accuracy of detection of touch coordinates in the second area within the first area.

An electronic device in accordance with a seventh aspect of the present invention can be arranged such that the electronic device includes: a touch panel control device according to any one of the third to fifth aspects of the present invention; and a hand determining section (hand determining section 32) configured to determine whether a hand holding the electronic device is a right hand or a left hand, and the area designating section changes a range designated for the second area according to a result of the determination performed by the hand determining section. According to the above configuration, the second area can be set to have an appropriate designated range according to whether a hand holding the electronic device is a right hand or a left hand.

[Supplementary Note]

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1: Touch panel
2: TP controller
3: Host
10: Electronic device
11: Touch panel control device
21: Driving circuit
22: Detection circuit
23: Control circuit
31: Area designating section
32: Hand determining section
231: Coordinates calculating section
AR0: Whole area (first area)
AR1 to AR5: Specific area (second area)
dr1: Specific area (second area)
dr1 to dr8: Specific area (second area)
Tx1 to Tx8: Drive electrode
Rx1 to Rx6: Detection electrode

The invention claimed is:

1. A touch panel control device comprising:
a driving circuit configured to apply a drive signal to a plurality of drive electrodes of a touch panel;
a detection circuit configured to detect a detection signal from a plurality of detection electrodes of the touch panel;
a control circuit configured to control the driving circuit and the detection circuit; and
a coordinates calculating section configured to determine coordinates of a touch position on the touch panel based on the detection signal detected by the detection circuit,
the driving circuit being capable of scanning a predetermined drive electrode of the plurality of drive electrodes,
the detection circuit being capable of scanning a predetermined detection electrode of the plurality of detection electrodes,
the control circuit controlling the driving circuit and the detection circuit so that the driving circuit and the detection circuit perform scanning on the plurality of drive electrodes and the plurality of detection electrodes, both of which construct a first area of the touch panel, and perform scanning at least once on part of the plurality of detection electrodes and part of the plurality of drive electrodes, both of which construct a second area within the first area, after the scanning on the first area has been performed but before a subsequent scanning on the first area is started, and
the control circuit controlling the driving circuit and the detection circuit to perform scanning on the second area within the first area after performing one scanning on the first area and then perform subsequent scanning on the first area.

2. The touch panel control device according to claim 1, wherein
the coordinates calculating section determines the coordinates of the touch position by performing averaging processing on the detection signal detected by the detection circuit.

3. The touch panel control device according to claim 1, further comprising:
an area designating section configured to make designation of the second area,
the control circuit performing scanning on the second area in a case where the area designating section has made designation of the second area.

4. The touch panel control device according to claim 3, wherein
the area designating section makes designation of the second area in a case where a power saving mode has been turned on.

5. The touch panel control device according to claim 3, wherein
the touch panel is divided into a plurality of segments, and
the area designating section designates, as the second area, at least one segment out of the plurality of segments.

6. The touch panel control device according to claim 5, wherein
the area designating section designates, as the second area, (i) one segment out of the plurality of segments and (ii) another at least one segment which exists around the one segment.

7. An electronic device comprising:
a touch panel control device recited according to claim 3 and
a hand determining section configured to determine whether a hand holding the electronic device is a right hand or a left hand,
the area designating section changing a range designated for the second area according to a result of the determination performed by the hand determining section.

8. The touch panel control device as set forth in claim 1, wherein the control circuit controls the driving circuit and the detection circuit to perform scanning on the second area within the first area a plurality of times.

\* \* \* \* \*